US012694613B2

(12) United States Patent
Zheng et al.

(10) Patent No.: US 12,694,613 B2
(45) Date of Patent: Jul. 28, 2026

(54) METHOD, APPARATUS AND ELECTRONIC DEVICE FOR HAND THREE-DIMENSIONAL RECONSTRUCTION

(71) Applicant: Beijing Zitiao Network Technology Co., Ltd., Beijing (CN)

(72) Inventors: Xiaozheng Zheng, Beijing (CN); Chao Wen, Beijing (CN); Zhou Xue, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 131 days.

(21) Appl. No.: 18/655,969

(22) Filed: May 6, 2024

(65) Prior Publication Data

US 2024/0371092 A1 Nov. 7, 2024

(30) Foreign Application Priority Data

May 6, 2023 (CN) .......................... 202310505262.2

(51) Int. Cl.
*G06T 17/00* (2006.01)
*G06T 19/20* (2011.01)
(Continued)

(52) U.S. Cl.
CPC .............. *G06T 17/00* (2013.01); *G06T 19/20* (2013.01); *G06V 10/7715* (2022.01);
(Continued)

(58) Field of Classification Search
CPC ........ G06N 3/08; G06N 3/048; G06N 3/0464; G06N 3/045; G06N 3/084; G06T 5/77;

G06T 7/13; G06T 7/70; G06T 17/00; G06T 19/20; G06T 2210/56; G06T 2219/2016; G06T 2207/20084; G06T 2207/10028; G06T 17/20; G06T 2207/20081;
(Continued)

(56) References Cited

U.S. PATENT DOCUMENTS

| | | | |
|---|---|---|---|
| 10,706,584 B1* | 7/2020 | Ye ......................... | G06F 18/214 |
| 2018/0129869 A1* | 5/2018 | Yu ........................ | G06V 40/169 |
| 2021/0251590 A1* | 8/2021 | Guo ..................... | A61B 6/5223 |

FOREIGN PATENT DOCUMENTS

| | | |
|---|---|---|
| CN | 109189206 A | 1/2019 |
| CN | 111105493 A | 5/2020 |

(Continued)

*Primary Examiner* — Wesner Sajous

(57) ABSTRACT

The embodiments of the disclosure provide a method, apparatus, and electronic device for hand three-dimensional reconstruction. One specific implementation of the method includes: obtaining hand images acquired at at least two angles of view; determining an initial hand three-dimensional reconstruction result corresponding to each of the hand images based on a predetermined hand three-dimensional reconstruction network, wherein the hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result. With consistency of a plurality of angles of views, the implementation may make the fused hand three-dimensional reconstruction result more accurate.

20 Claims, 6 Drawing Sheets

(51) Int. Cl.

| | | |
|---|---|---|
| *G06V 10/77* | (2022.01) | |
| *G06V 10/776* | (2022.01) | |
| *G06V 10/80* | (2022.01) | |
| *G06V 10/82* | (2022.01) | |
| *G06V 40/10* | (2022.01) | |

(52) U.S. Cl.
CPC .......... *G06V 10/776* (2022.01); *G06V 10/806* (2022.01); *G06V 10/82* (2022.01); *G06V 40/107* (2022.01); *G06T 2219/2016* (2013.01)

(58) Field of Classification Search
CPC ......... G06T 2207/10024; G06F 18/253; G06F 18/00; G06V 10/82; G06V 10/806; G06V 10/776; G06V 10/7715; G06V 10/25; G06V 10/28; G06V 10/44; G06V 20/64; G06V 40/117; G06V 40/107
See application file for complete search history.

(56) References Cited

FOREIGN PATENT DOCUMENTS

| CN | 111281534 A | 6/2020 | | |
|---|---|---|---|---|
| CN | 111433783 A | 7/2020 | | |
| CN | 114386259 B | * | 4/2025 | ........... G06F 18/253 |
| EP | 3203412 A1 | * | 8/2017 | ............. G06V 10/82 |

\* cited by examiner

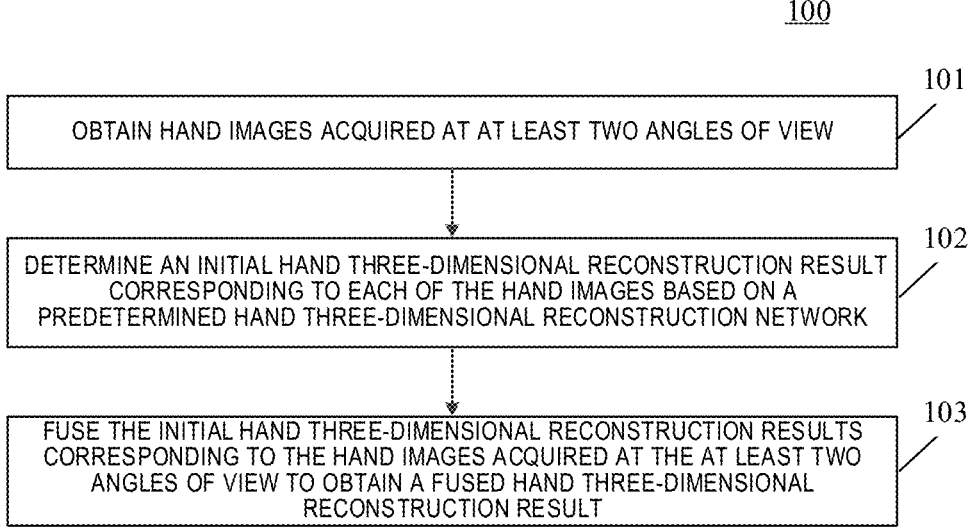

100

OBTAIN HAND IMAGES ACQUIRED AT AT LEAST TWO ANGLES OF VIEW 101

DETERMINE AN INITIAL HAND THREE-DIMENSIONAL RECONSTRUCTION RESULT CORRESPONDING TO EACH OF THE HAND IMAGES BASED ON A PREDETERMINED HAND THREE-DIMENSIONAL RECONSTRUCTION NETWORK 102

FUSE THE INITIAL HAND THREE-DIMENSIONAL RECONSTRUCTION RESULTS CORRESPONDING TO THE HAND IMAGES ACQUIRED AT THE AT LEAST TWO ANGLES OF VIEW TO OBTAIN A FUSED HAND THREE-DIMENSIONAL RECONSTRUCTION RESULT 103

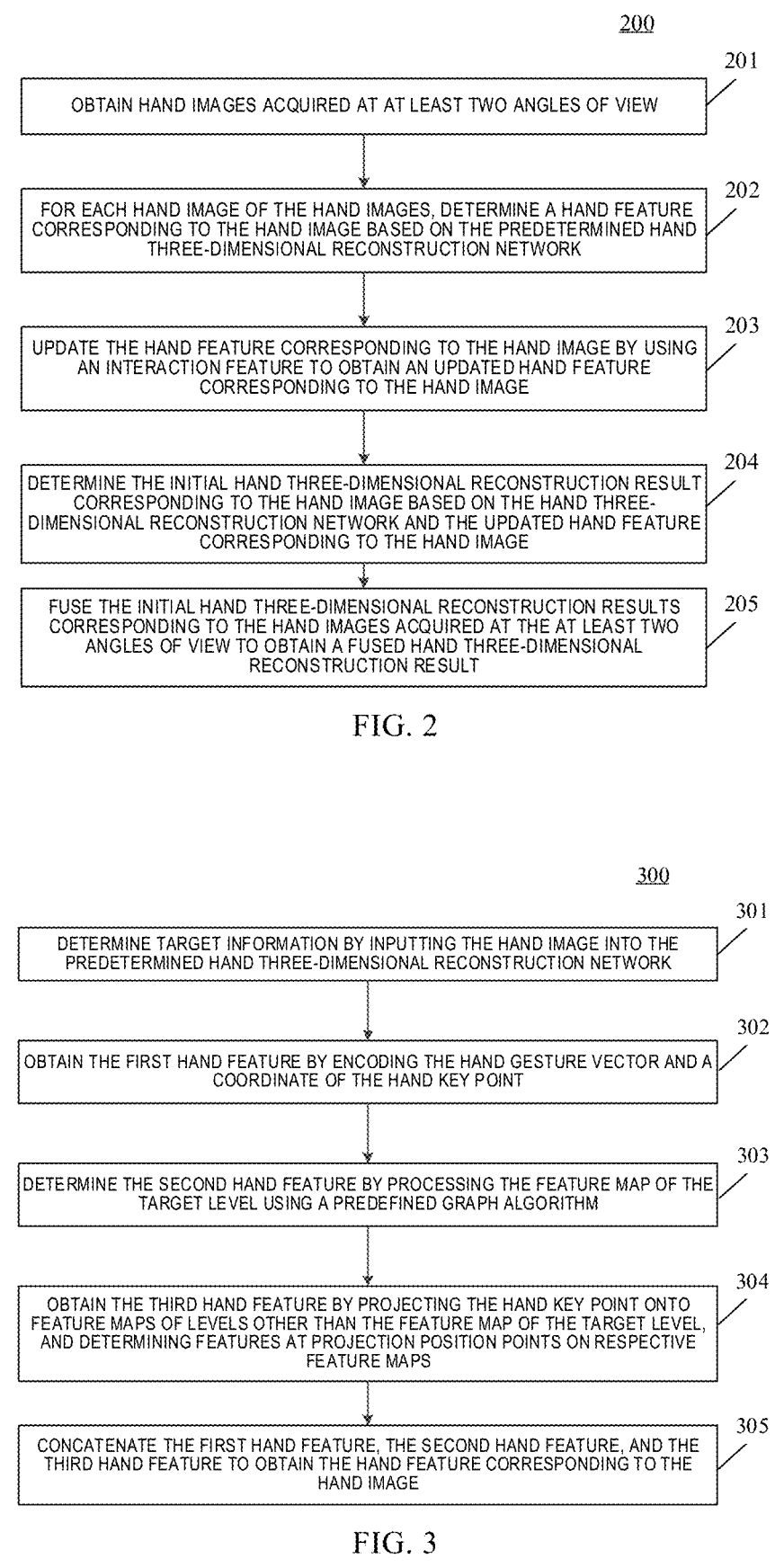

OBTAIN HAND IMAGES ACQUIRED AT AT LEAST TWO ANGLES OF VIEW

202

FOR EACH HAND IMAGE OF THE HAND IMAGES, DETERMINE A HAND FEATURE CORRESPONDING TO THE HAND IMAGE BASED ON THE PREDETERMINED HAND THREE-DIMENSIONAL RECONSTRUCTION NETWORK

203

UPDATE THE HAND FEATURE CORRESPONDING TO THE HAND IMAGE BY USING AN INTERACTION FEATURE TO OBTAIN AN UPDATED HAND FEATURE CORRESPONDING TO THE HAND IMAGE

204

DETERMINE THE INITIAL HAND THREE-DIMENSIONAL RECONSTRUCTION RESULT CORRESPONDING TO THE HAND IMAGE BASED ON THE HAND THREE-DIMENSIONAL RECONSTRUCTION NETWORK AND THE UPDATED HAND FEATURE CORRESPONDING TO THE HAND IMAGE

205

FUSE THE INITIAL HAND THREE-DIMENSIONAL RECONSTRUCTION RESULTS CORRESPONDING TO THE HAND IMAGES ACQUIRED AT THE AT LEAST TWO ANGLES OF VIEW TO OBTAIN A FUSED HAND THREE-DIMENSIONAL RECONSTRUCTION RESULT

DETERMINE TARGET INFORMATION BY INPUTTING THE HAND IMAGE INTO THE PREDETERMINED HAND THREE-DIMENSIONAL RECONSTRUCTION NETWORK

302

OBTAIN THE FIRST HAND FEATURE BY ENCODING THE HAND GESTURE VECTOR AND A COORDINATE OF THE HAND KEY POINT

303

DETERMINE THE SECOND HAND FEATURE BY PROCESSING THE FEATURE MAP OF THE TARGET LEVEL USING A PREDEFINED GRAPH ALGORITHM

304

OBTAIN THE THIRD HAND FEATURE BY PROJECTING THE HAND KEY POINT ONTO FEATURE MAPS OF LEVELS OTHER THAN THE FEATURE MAP OF THE TARGET LEVEL, AND DETERMINING FEATURES AT PROJECTION POSITION POINTS ON RESPECTIVE FEATURE MAPS

305

CONCATENATE THE FIRST HAND FEATURE, THE SECOND HAND FEATURE, AND THE THIRD HAND FEATURE TO OBTAIN THE HAND FEATURE CORRESPONDING TO THE HAND IMAGE

FIG. 3

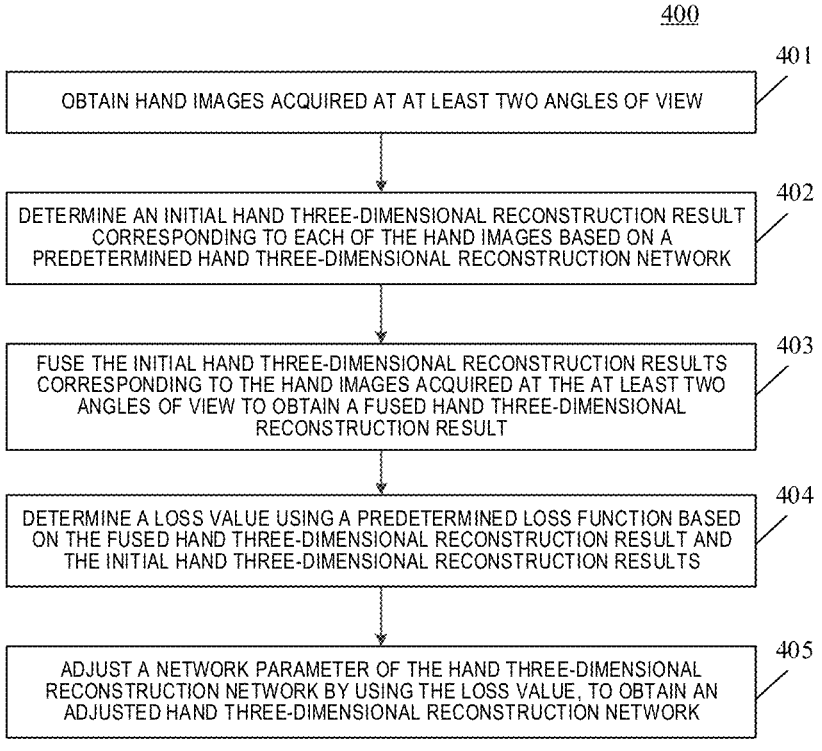

400

401

OBTAIN HAND IMAGES ACQUIRED AT AT LEAST TWO ANGLES OF VIEW

402

DETERMINE AN INITIAL HAND THREE-DIMENSIONAL RECONSTRUCTION RESULT CORRESPONDING TO EACH OF THE HAND IMAGES BASED ON A PREDETERMINED HAND THREE-DIMENSIONAL RECONSTRUCTION NETWORK

403

FUSE THE INITIAL HAND THREE-DIMENSIONAL RECONSTRUCTION RESULTS CORRESPONDING TO THE HAND IMAGES ACQUIRED AT THE AT LEAST TWO ANGLES OF VIEW TO OBTAIN A FUSED HAND THREE-DIMENSIONAL RECONSTRUCTION RESULT

404

DETERMINE A LOSS VALUE USING A PREDETERMINED LOSS FUNCTION BASED ON THE FUSED HAND THREE-DIMENSIONAL RECONSTRUCTION RESULT AND THE INITIAL HAND THREE-DIMENSIONAL RECONSTRUCTION RESULTS

405

ADJUST A NETWORK PARAMETER OF THE HAND THREE-DIMENSIONAL RECONSTRUCTION NETWORK BY USING THE LOSS VALUE, TO OBTAIN AN ADJUSTED HAND THREE-DIMENSIONAL RECONSTRUCTION NETWORK

METHOD, APPARATUS AND ELECTRONIC DEVICE FOR HAND THREE-DIMENSIONAL RECONSTRUCTION

CROSS-REFERENCE

The present application claims priority to Chinese Patent Application No. 202310505262.2, filed on May 6, 2023, and entitled "METHOD, APPARATUS AND ELECTRONIC DEVICE FOR HAND THREE-DIMENSIONAL RECONSTRUCTION", the entirety of which is incorporated herein by reference.

FIELD

Embodiments of the present disclosure relate to the field of computer technologies, and in particular, to a method, apparatus, and electronic device for hand three-dimensional reconstruction.

BACKGROUND

With continuous development of science and technology, the virtual reality technology has also been developed rapidly. For example, a virtual hand corresponding to a user may be presented in a virtual scene, and the user may also control the generated virtual hand in moving in the virtual scene. In this way, a better virtual browsing experience may be brought to the user.

SUMMARY

This section of the present disclosure is provided to introduce the ideas in a simplified form, which will be described in detail in the Detailed Description section that follows. The present disclosure is not intended to identify key features or essential features of the claimed subject matter, nor is it intended to be used to limit the scope of the claimed subject matter.

According to a first aspect, an embodiment of the present disclosure provides a method for hand three-dimensional reconstruction, including: obtaining hand images acquired at at least two angles of view; determining an initial hand three-dimensional reconstruction result corresponding to each of the hand images based on a predetermined hand three-dimensional reconstruction network, wherein the hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

According to a second aspect, an embodiment of the present disclosure provides an apparatus for hand three-dimensional reconstruction, including: an obtaining unit configured to obtain hand images acquired at at least two angles of view; a determining unit configured to determine an initial hand three-dimensional reconstruction result corresponding to each of the hand images based on a predetermined hand three-dimensional reconstruction network, wherein the hand three-dimensional reconstruction result comprises a hand three-dimensional model and a hand key point; and a fusing unit configured to fuse the initial hand three-dimensional reconstruction results corresponding to the hand images acquired at the at least two angles of view to obtain a fused hand three-dimensional reconstruction result.

According to a third aspect, an embodiment of the present disclosure provides an electronic device, comprising: one or more processors; and a storage device having one or more programs stored thereon, when the one or more programs are executed by the one or more processors, the one or more processors implement the method for hand three-dimensional reconstruction according to the first aspect.

According to a fourth aspect, an embodiment of the present disclosure provides a computer readable medium having a computer program stored thereon, wherein when the program is executed by a processor, the steps of the method for hand three-dimensional reconstruction according to the first aspect is implemented.

BRIEF DESCRIPTION OF THE DRAWINGS

The above and other features, advantages, and aspects of various embodiments of the present disclosure will become more apparent with reference to the following detailed description in conjunction with the accompanying drawings. The same or like reference numerals represent the same or like elements throughout the drawings. It shall be understood that the drawings are illustrative and that the components and elements are not necessarily drawn to scale.

FIG. 1 is a flowchart of one embodiment of a method for hand three-dimensional reconstruction according to the present disclosure;

FIG. 2 is a flowchart of another embodiment of the method for hand three-dimensional reconstruction according to the present disclosure;

FIG. 3 is a flowchart of one embodiment of determining a hand feature corresponding to a hand image in the method for hand three-dimensional reconstruction according to the present disclosure;

FIG. 4 is a flowchart of yet another embodiment of the method for hand three-dimensional reconstruction according to the present disclosure;

DETAILED DESCRIPTION

Figure 5:
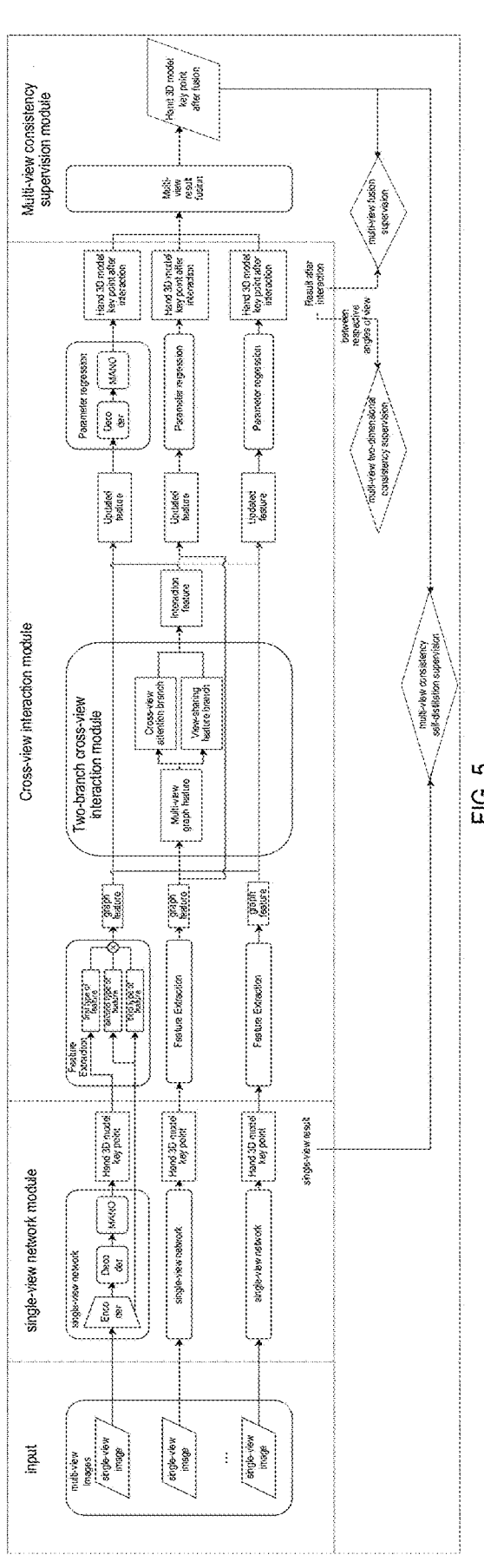
FIG. 5 is a schematic diagram of an application scenario of the method for hand three-dimensional reconstruction according to the present disclosure.

Embodiments of the present disclosure will be described in more detail below with reference to the accompanying drawings. Although certain embodiments of the disclosure are shown in the drawings, it should be understood that the present disclosure may be implemented in various forms and should not be construed as limited to the embodiments set forth herein, but rather these embodiments are provided for thoroughly and fully understand the present disclosure. It should be understood that the drawings and embodiments of the present disclosure are provided for illustrative purposes only but not intended to limit the scope of the present disclosure.

It should be understood that various steps described in the method implementations of the present disclosure may be executed in different orders and/or in parallel. Furthermore, the method implementations may include additional steps and/or the illustrated steps may be omitted. The scope of the present disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

Referring to FIG. 1, FIG. 1 illustrates a flow 100 of one embodiment of a method for hand three-dimensional reconstruction in accordance with the present disclosure. The method for hand three-dimensional reconstruction comprises the following steps:

Step 101, obtaining hand images acquired at at least two angles of view.

In this embodiment, the execution subject of the method for hand three-dimensional reconstruction may obtain the hand images acquired at the at least two angles of view. Here, the same hand can be shot by using a multi-lens camera, so as to obtain hand images at the at least two angles of view.

Step 102, determining an initial hand three-dimensional reconstruction result corresponding to each of the hand images based on a predetermined hand three-dimensional reconstruction network.

In this embodiment, the execution subject may determine, based on the predetermined hand three-dimensional reconstruction network, an initial hand three-dimensional reconstruction result corresponding to each of the hand images. The hand three-dimensional reconstruction result may include a hand three-dimensional model and a hand key point. The hand three-dimensional reconstruction network may be used to represent a correspondence between an image and the hand three-dimensional reconstruction result corresponding to the image.

Here, for each hand image of the hand images acquired at the at least two angles of view, the execution subject may input the hand image into the hand three-dimensional reconstruction network to obtain a hand three-dimensional reconstruction result corresponding to the image, and take the hand three-dimensional reconstruction result output by the hand three-dimensional reconstruction network as the initial hand three-dimensional reconstruction result.

Here, the hand three-dimensional reconstruction network may be a network structure shared by the plurality of angles of view, that is to say, the input hand images acquired at at least two angles of view will pass through a hand three-dimensional reconstruction network with the same weight and structure, and this part of the network estimates parameters of a hand at a single view angle, thereby realizing three-dimensional reconstruction of the hand.

The above-mentioned hand three-dimensional reconstruction network belongs to a category of parameterized algorithm, and it generally comprises an encoder part, a decoder part and a MANO layer (an orchestration network model), specifically:

The encoder part may be a residual network (e. g., ResNet 50), and the residual network may contain a 50-layer convolution and may use an activation function (e. g., a Rectified Linear Unit function (ReLU activation function)) and BatchNorm (also referred to as Batch Normalization, which is a method of normalizing the inputs of layers by recentering and rescaling to make training of an artificial neural network faster and more stable) to perform normalization, and finally output a global feature to a decoder by using global average normalization.

The decoder part may be a fully-connected network and may include 2 layers and 2048 implicit units. The ReLU activation function may be used again. The decoder may predict an N-dimensional (for example, 10-dimensional) shape parameter vector and an M-dimensional (for example, 48-dimensional) hand gesture vector. The two types of parameter vectors may be reconstructed as the hand three-dimensional model through a MANO layer.

The MANO layer is used as a three-dimensional representation output, and the three-dimensional reconstruction is implemented by predicting MANO parameters.

Further, the relationship between the reconstructed hand three-dimensional model (M) and the hand key point (P) may be obtained through calculation according to a regression matrix (J) pre-defined by the MANO layer, for example, $P=J*M$, $*$ is a matrix multiplication.

Step 103: fusing the initial hand three-dimensional reconstruction results corresponding to the hand images acquired at the at least two angles of view to obtain a fused hand three-dimensional reconstruction result.

In this embodiment, the execution subject may fuse the initial hand three-dimensional reconstruction results corresponding to the hand images acquired at the at least two angles of view, so as to obtain a fused hand three-dimensional reconstruction result.

Specifically, the execution subject may fuse the hand three-dimensional models at respective angles of view by averaging, and may also fuse the hand key points at respective angles of view by averaging.

According to the method provided in the above embodiments of the present disclosure, hand images acquired at at least two angles of view are obtained; then, an initial hand three-dimensional reconstruction result corresponding to each of the hand images is determined based on a predetermined hand three-dimensional reconstruction network; finally, the initial hand three-dimensional reconstruction results corresponding to the hand images acquired at the at least two angles of view are fused to obtain a fused hand three-dimensional reconstruction result. In this way, the initial hand three-dimensional reconstruction results corresponding to hand images acquired at various angles of view are fused, and with consistency of multiple angles of view, the fused hand three-dimensional reconstruction result is more accurate.

Continuing to refer to FIG. 2, FIG. 2 illustrates a flow 200 of another embodiment of the method for hand three-dimensional reconstruction. The flow 200 of the method for hand three-dimensional reconstruction includes the following steps:

Step 201, obtaining hand images acquired at at least two angles of view.

In this embodiment, Step 201 may be performed in a manner similar to Step 101, which is not described herein again.

Step 202, for each hand image of the hand images, determining a hand feature corresponding to the hand image based on the predetermined hand three-dimensional reconstruction network.

In this embodiment, for each hand image of the hand images acquired at the at least two angles of view, the execution subject of the method for hand three-dimensional reconstruction may determine, based on the predetermined hand three-dimensional reconstruction network, a hand feature corresponding to the hand image. The above-mentioned hand three-dimensional reconstruction network may be used for representing the correspondence between an image and the hand three-dimensional reconstruction result corresponding to the image.

Specifically, the hand three-dimensional reconstruction network generally includes an encoder. After the execution body inputs the hand image into the above-described hand three-dimensional reconstruction network, the encoder of the hand three-dimensional reconstruction network may output the hand feature corresponding to the hand image.

Step 203: updating the hand feature corresponding to the hand image by using an interaction feature to obtain an updated hand feature corresponding to the hand image.

In this embodiment, the execution subject may update the hand feature corresponding to the hand image by using the interaction feature, so as to obtain an updated hand feature corresponding to the hand image. The above-mentioned interaction feature is generally obtained by performing interaction based on hand features corresponding to respective hand images.

Specifically, the execution subject may perform matrix addition on the hand feature corresponding to the hand image and the interaction feature, to obtain the updated hand feature corresponding to the hand image.

Step 204, determining the initial hand three-dimensional reconstruction result corresponding to the hand image based on the hand three-dimensional reconstruction network and the updated hand feature corresponding to the hand image.

In this embodiment, the execution subject may determine, based on the hand three-dimensional reconstruction network and the updated hand feature corresponding to the hand image, the initial hand three-dimensional reconstruction result corresponding to the hand image.

Specifically, the execution subject may use the updated hand feature corresponding to the hand image as an input of the hand three-dimensional reconstruction network. A new hand gesture vector is returned through a fully-connected layer of the hand three-dimensional reconstruction network at respective angles of view, and an updated hand three-dimensional reconstruction result is obtained through a MANO layer as the initial hand three-dimensional reconstruction result corresponding to the hand image.

Step 205: fusing the initial hand three-dimensional reconstruction results corresponding to the hand images acquired at the at least two angles of view to obtain a fused hand three-dimensional reconstruction result.

In this embodiment, Step 205 may be performed in a manner similar to Step 103, which is not described herein again.

As can be seen from FIG. 2, compared with the embodiment corresponding to FIG. 1, the flow 200 of the method for performing hand three-dimensional reconstruction in this embodiment includes steps of updating the hand feature corresponding to the hand image by using the interaction feature, and determining the initial hand three-dimensional reconstruction result corresponding to the hand image based on the hand three-dimensional reconstruction network and the updated hand feature corresponding to the hand image. Thus, according to the solution described in this embodiment, interaction may be performed on the hand features corresponding to the hand images at respective angles of view, and update of the hand features is realized, so that with consistency of multiple angles of view, the hand feature corresponding to the angle of view is corrected, and the accuracy of an initial hand three-dimensional reconstruction result corresponding to the angle of view is further improved.

In some optional implementations, the execution subject may determine the hand feature corresponding to the hand image based on the predetermined hand three-dimensional reconstruction network in the following manner:

The execution subject may input the hand image into the predetermined hand three-dimensional reconstruction network and determine target information, where the target information may include feature maps of at least one level and a hand key point. Here, the execution subject may input the hand image into the predetermined hand three-dimensional reconstruction network, so as to obtain the hand key point corresponding to the hand image. In addition, after the hand image is input into the hand three-dimensional reconstruction network, an encoder of the hand three-dimensional reconstruction network may output feature maps of at least one level.

As an example, feature maps of four levels may be output, and the sizes of the feature maps may be (256*64*64), (512*32*32), (1024*16*16), (2048*8*8) respectively, marked as H1, H2, H3, and H4. Of course, in a specific implementation, the number of levels of the at least one level may be limited according to an actual situation, and herein, the number of levels of the at least one level is not limited, and a size of a feature map of each level is also not limited.

Then, the hand feature corresponding to the hand image may be determined based on the target information. For example, the hand key point may be input into a pre-trained hand feature extraction model to obtain the hand feature corresponding to the hand image. The above hand feature extraction model may be used to represent a correspondence between a hand key point corresponding to an image and a hand feature corresponding to the image. In this way, the hand feature corresponding to the hand image is determined by using the hand key point and the feature map at the at least one level, and the hand feature can be better aligned with the hand image. It shall be understood that the obtained hand feature may better represent the hand image, and thus making it easier to carry out the feature interaction. Thus, after carrying out the feature interaction, the hand features corresponding to the respective hand images are more accurate.

In some optional implementations, the target information includes a hand gesture vector. The execution subject may determine a hand feature corresponding to the hand image based on the target information in the following way: the execution subject may determine the hand feature corresponding to the hand image based on at least one of a first hand feature, a second hand feature, and a third hand feature. That is to say, any one of the first hand feature, the second hand feature and the third hand feature may be determined as the hand feature corresponding to the hand image; or the hand feature corresponding to the hand image may be determined by using any two of the first hand feature, the second hand feature and the third hand feature.

Here, the first hand feature may be obtained by encoding the hand gesture vector and a coordinate of the hand key point. During the encoding process, x layers of fully-connected layers may be used to convert into a high-dimension graph feature (G1) of a certain dimension, and the high-dimension image feature (G1) may be understood as the first hand feature.

The second hand feature may be determined by processing a feature map of a target level using a predefined graph algorithm. Herein, the feature map of the target level may be a feature map with the smallest size among the feature maps of the at least one level. The execution subject may convert the feature map of the target level into a high-dimensional graph feature (G2) of another dimension by using a space awareness initial graph building (SAIGB) algorithm, and the high-dimensional graph feature (G2) may be understood as the second hand feature.

The third hand feature may be obtained by projecting the hand key point onto feature maps at other levels other than the feature map at the target level, and determining features at projection position points on respective feature maps. Here, the features of the projection location points on respective feature maps may be organized into a high-dimensional graph feature (G3) of a further dimension, and the high-dimensional graph feature (G3) may be understood as a third hand feature.

In this way, the hand feature corresponding to the hand image may be determined by using at least one of the first hand feature, the second hand feature, and the third hand feature, so that the hand feature may be determined more flexibly.

In some optional implementations, the interaction feature may be determined in the following way: the execution subject may perform interaction on the hand features corresponding to respective hand images based on a predetermined cross-view attention algorithm and/or a predetermined view-sharing algorithm, to obtain the interaction feature. The principle can be understood as implementing interactive update of features by fusing and comparing features corresponding to a plurality of single-view images. The cross-view attention algorithm described above captures global feature interaction by computing an attention score between hand nodes. The above view-sharing algorithm obtains features shared by all angles of view by sharing the features at the plurality of angles of view.

In some optional implementations, the cross-view attention algorithm may determine the interaction feature in the following way: the execution subject may determine an attention score between hand key points corresponding to respective hand images; and performing the interaction on the hand features corresponding to the respective hand images by using the attention score to obtain the interaction feature. In particular, the cross-view attention algorithm may be consisted of x layers of transformer encoder layer, and the attention score between all nodes of the hand at the plurality of angles of view may be calculated to capture global feature interaction.

In some optional implementations, the above view-sharing algorithm may determine the interaction feature in the following way: the above execution subject may determine features of respective hand key points with the highest response at different angles of view using maximum value pooling; then, perform the interaction on the hand features corresponding to respective hand images by using the features of the respective hand key points with the highest response at different angles of view to obtain the interaction feature. Specifically, the view-sharing algorithm may first extract a normalized feature by passing the feature through an adaptive graph convolutional network (Adaptive-GCN), then obtain a feature of each hand key point with the highest response at different angles of view using maximum value pooling, and finally perform data reshape, so as to obtain the feature shared at all angles of view.

Determining the interaction feature by using the two algorithms may enable the interaction feature to integrate features of a plurality of angles of view, so that the determined interaction feature is more reasonable.

Further referring to FIG. 3, FIG. 3 illustrates a flow 300 of one embodiment of determining the hand feature corresponding to the hand image in the method for hand three-dimensional reconstruction. The flow 300 of determining the hand feature corresponding to the hand image comprises the following steps:

Step 301: determining target information by inputting the hand image into the predetermined hand three-dimensional reconstruction network.

In this embodiment, the execution subject of the method for hand three-dimensional reconstruction may input the hand image into the predetermined hand three-dimensional reconstruction network and determine the target information, where the target information may include feature maps of at least one level, a hand key point, and the hand gesture vector.

Here, the execution subject may input the hand image into the predetermined hand three-dimensional reconstruction network, so as to obtain the hand key point corresponding to the hand image. In addition, after the hand image is input into the hand three-dimensional reconstruction network, an encoder of the hand three-dimensional reconstruction network may output a feature map at at least one level.

As an example, four levels of feature maps may be output, and the sizes of the feature maps may be (256*64*64), (512*32*32), (1024*16*16), (2048*8*8) respectively, marked as H1, H2, H3, and H4. Of course, in a specific implementation, the number of levels of the at least one level may be limited according to an actual situation, and herein, the number of levels of the at least one level is not limited, a size of a feature map of each level is also not limited, and the specific level selected is also not limited, as long as the selection is reasonable according to actual situations.

Step 302: obtaining the first hand feature by encoding the hand gesture vector and a coordinate of the hand key point.

In this embodiment, the execution subject may encode the hand gesture vector and a coordinate of the hand key point determined in Step 301, and may convert the hand gesture vector and the coordinate of the hand key point into a high-dimension image feature (G1) of a certain dimension by using x layers of fully-connected layers in an encoding process, and the high-dimension image feature (G1) may be understood as the first hand feature.

Step 303: determining the second hand feature by processing the feature map of the target level using a predefined graph algorithm.

In this embodiment, the execution subject may process the feature map of the target level by using the predefined image algorithm, so as to determine the second hand feature. Here, the feature map of the target level may be a feature map of a smallest size among the feature maps of the at least one level.

As an example, the sizes of the feature maps are: (256*64*64), (512*32*32), (1024*16*16), (2048*8*8) respectively, which are marked as H1, H2, H3 and H4; the first item of the above sizes represents resolution, and the last two items represent the size. Because the feature map H4 has the smallest size (2048*8*8), the feature map H4 may be determined as the feature map of the target level.

Specifically, the execution subject may convert the feature map (for example, H4) of the target level into a high-dimensional image feature (G2) of another dimension by using an initial graph construction algorithm of space awareness, where the high-dimensional image feature (G2) may be understood as the second hand feature.

Step 304, obtaining the third hand feature by projecting the hand key point onto feature maps of other levels other than the feature map of the target level, and determining features at projection position points on respective feature maps.

In this embodiment, the execution subject may project the hand key point determined in Step 301 onto feature maps (for example, H1, H2, and H3) of other levels other than the feature map of the target level. Features of projection location points on respective feature maps may be organized into a high-dimensional feature (G3) of another dimension, where the high-dimensional feature (G3) may be understood as a third hand feature.

Step 305: concatenating the first hand feature, the second hand feature, and the third hand feature to obtain the hand feature corresponding to the hand image.

In this embodiment, the execution subject may concatenate the first hand feature obtained in step 302, the second hand feature obtained in step 303, and the third hand feature obtained in step 304 along a channel dimension to form a graph feature, where the graph feature may be understood as the hand feature corresponding to the hand image.

The method provided by the above embodiments of the present disclosure determines the target information including the hand key point, the feature maps of at least one level, and the hand gesture vector by inputting the hand image into a predetermined hand three-dimensional reconstruction network, determines three types of hand features by using the target information in three ways, and, finally determines the hand feature corresponding to the hand image by utilizing these three types of hand features. Since the first hand feature can reflect a prediction result of a single-view image added with pseudo-labels for the hand model, and the second hand feature and the third hand feature can reflect features of different scales (fine-grained and coarse-grained), therefore, the hand feature may be determined by using the first hand feature, the second hand feature and the third hand feature, so that there are more categories and a large number of features included in the determined hand features, so that the feature interaction update can be implemented better and more accurately.

Continuing to referring to FIG. 4, FIG. 4 is a flow 400 of another embodiment of a method for hand three-dimensional reconstruction. The flow 400 of the method for hand three-dimensional reconstruction includes the following steps:

Step 401, obtaining hand images acquired at at least two angles of view.

Step 402: determining an initial hand three-dimensional reconstruction result corresponding to each of the hand images based on a predetermined hand three-dimensional reconstruction network.

Step 403: fusing the initial hand three-dimensional reconstruction results corresponding to the hand images acquired at the at least two angles of view to obtain a fused hand three-dimensional reconstruction result.

In this embodiment, Steps 401-403 may be performed in a manner similar to Steps 101-103, and details are not repeatedly described herein.

Step 404, determining a loss value using a predetermined loss function based on the fused hand three-dimensional reconstruction result and the initial hand three-dimensional reconstruction results.

In this embodiment, the execution subject of the method for hand three-dimensional reconstruction may determine the loss value by using the predetermined loss function (for example, an L1 norm) based on the fused hand three-dimensional reconstruction result and the initial hand three-dimensional reconstruction results.

Step 405, adjusting a network parameter of the hand three-dimensional reconstruction network by using the loss value, to obtain an adjusted hand three-dimensional reconstruction network.

In this embodiment, the execution subject may adjust the network parameter of the hand three-dimensional reconstruction network by using the loss value, so as to obtain the adjusted hand three-dimensional reconstruction network. Here, the training may be ended when a predetermined training ending condition is satisfied. For example, the predetermined training ending condition may include, but is not limited to, at least one of the following: a training time exceeding a predetermined duration; the number of training times exceeding a predetermined number of times; and the calculated difference being less than a predetermined difference threshold.

Here, the network parameter of the above hand three-dimensional reconstruction network may be adjusted based on the loss value in various implementations. For example, a BP (Back Propagation) algorithm or a SGD (Stochastic Gradient Descent) algorithm may be used to adjust the network parameter of the hand three-dimensional reconstruction network. It should be noted that, any algorithm for adjusting the network parameter may be used to adjust the network parameter, which is not limited herein.

It can be seen from FIG. 4 that, compared with the embodiment corresponding to FIG. 1, the flow 400 of the method for hand three-dimensional reconstruction in this embodiment includes steps of determining the loss value using the predetermined loss function based on the fused hand three-dimensional reconstruction result and the initial hand three-dimensional reconstruction results, and adjusting the network parameter of the hand three-dimensional reconstruction network by using the loss value, to obtain the adjusted hand three-dimensional reconstruction network. Thus, the solution described in this embodiment may adjust the network parameter of the hand three-dimensional reconstruction network, so that the hand three-dimensional reconstruction network can perform three-dimensional reconstruction on the hand more accurately.

In some optional implementations, the execution subject may determine a loss value using a predetermined loss function based on the fused hand three-dimensional reconstruction result and the initial hand three-dimensional reconstruction results in the following way: the execution subject may determine a difference between the fused hand three-dimensional reconstruction result and the initial hand three-dimensional reconstruction result as a loss value, thereby, the output result of the hand three-dimensional reconstruction network is supervised.

Here, if the initial hand three-dimensional reconstruction result is the hand three-dimensional reconstruction result output by the hand three-dimensional reconstruction network, the supervision may be referred to as multi-view consistency autodistillation supervision, and the corresponding loss function may be referred to as multi-view consistency autodistillation loss function. In this way, the output result of the single angle of view network module can be as close to the fused result as possible, thereby improving the accuracy of the output result of the single-view network module. If the initial hand three-dimensional reconstruction result is the updated hand three-dimensional reconstruction result, the supervision may be referred to as multi-view fused supervision, and the corresponding loss function may be referred to as multi-view fused supervision loss function. In this way, the output result of the cross-view interaction module may be as close to the fused result as possible, thereby improving the accuracy of the output result of the cross-view interaction module.

In some optional implementations, the execution subject may determine a loss value using a predetermined loss function based on the fused hand three-dimensional reconstruction result and the initial hand three-dimensional reconstruction results in the following way: for each of the at least two angles of view, the execution subject may project the initial hand three-dimensional model (generally, the updated hand three-dimensional model) corresponding to the angle of view onto the hand image at the angle of view to obtain a first projection point set. Then, the initial hand three-dimensional model (generally, the updated hand three-dimensional model) corresponding to an angle of view other than the angle of view may be rotated into the angle of view according to the camera position relationship, and the rotated hand three-dimensional model may be projected onto the hand image at the angle of view, so as to obtain a second projection point set. Then, the difference between the first projection point set and the second projection point set may be determined as the loss value, so as to supervise the output result of the hand three-dimensional reconstruction network. This supervision may be referred to as multi-view two-dimensional consistency supervision, and a corresponding loss function may be referred to as multi-view two-dimensional consistency loss function.

As an example, if images are acquired at three angles of view, for a first angle of view among the three angles of view, an updated hand three-dimensional model corresponding to the first angle of view is projected onto the hand image acquired at the first angle of view to obtain a first projection point set; then, the updated hand three-dimensional model corresponding to an angle of view (namely, a second angle of view or a third angle of view) other than a first angle of view is rotated into the first angle of view according to a camera position relationship, and the rotated hand three-dimensional model is projected onto the hand image acquired at the first angle of view, so as to obtain a second projection point set; then, difference between the first projection point set and the second projection point set is obtained, and the difference are determined as the loss value.

By using this supervision method, hand three-dimensional models corresponding to all the angles of view are converted to be at the same angle of view, and difference between projection points corresponding to all the hand three-dimensional models under the same angle of view is obtained; and an output result of a hand three-dimensional reconstruction network is supervised by means of consistency between the angles of view, so that the output result of the hand three-dimensional reconstruction network is more accurate.

In some optional implementations, the execution subject may determine the loss value using the predetermined loss function based on the fused hand three-dimensional reconstruction result and the initial hand three-dimensional reconstruction results in the following way: the execution subject may identify hand key points in the hand images captured at the at least two angles of view as a pseudo tag by using a predefined hand key point positioning algorithm (for example, OpenPose algorithm) identifies hand key points in the hand images acquired at the at least two angles of view as pseudo tags. Then, the difference between the described pseudo tag and an initial hand key point (hand key point output by the hand three-dimensional reconstruction network) can be taken as the loss value, so as to supervise the output result of the hand three-dimensional reconstruction network. This supervision way may be referred to as pseudo tag supervision, and the corresponding loss function may be referred to as pseudo tag loss function.

In such a supervision manner, the hand key point output by the network may be as close to the pseudo tag as possible, thereby constraining the output result of the single angle of view network module.

In some optional implementations, the execution subject may determine the loss value using the predetermined loss function based on the fused hand three-dimensional reconstruction result and the initial hand three-dimensional reconstruction results in the following way: the execution subject may obtain a predetermined hand three-dimensional model reference template, where the predetermined hand three-dimensional model reference template is a predetermined standard hand three-dimensional model. Then, the difference between the hand three-dimensional model reference template and an initial hand three-dimensional model (the hand three-dimensional model output by the hand three-dimensional reconstruction network) may be taken as a loss value, so as to supervise the output result of the hand three-dimensional reconstruction network. This supervision may be referred to as parameter prior supervision, and the corresponding loss function may be referred to as a parameter prior loss function.

In such a supervision manner, the hand three-dimensional model output by the network can be as close to the average gesture as possible, thereby further constraining the output result of the single-view network module.

Continuing to referring to FIG. 5, FIG. 5 is a schematic diagram of an application scenario of the method for hand three-dimensional reconstruction according to this embodiment. In the application scenario of FIG. 5, a plurality of input single-view images passes through a single-view network module, a cross-view interaction module and a multi-view consistency supervision module.

In a single-view network module, single-view images acquired at a plurality of angles of view are input into a single-view network (namely, a hand three-dimensional reconstruction network), and a hand three-dimensional model and a key point (namely, a hand three-dimensional reconstruction result) may be output. Here, the single-view network may include an encoder, a decoder, and a MANO layer.

In the cross-view interaction module, the hand feature may be extracted from each single-view image first. Here, three types of hand features (namely, a first type of feature, a second type of feature and a third type of feature) may be extracted, and the three types of hand features are spliced to obtain a graph feature of the single-view image. After that, the graph features of respective single-view images may be fused to obtain a multi-view graph feature. Then, a cross-view attention branch and a view-sharing feature branch may be used to perform interaction on the multi-view graph feature, so as to obtain the interaction feature. For each angle of view, a graph feature corresponding to the angle of view is updated by using the interaction feature, so as to obtain an updated feature. Then, the updated feature may be input to the encoder and the MANO layer of the hand three-dimensional reconstruction network for parameter regression, so as to obtain the hand three-dimensional model and the key point after interaction.

In the multi-view consistency supervision module, the hand three-dimensional reconstruction results corresponding to the images acquired from a plurality of angles of view may be fused to obtain the fused hand three-dimensional model and key point. Here, the output result of the hand three-dimensional reconstruction network can be supervised using multi-view consistency self-distillation supervision, multi-view two-dimensional consistency supervision, and multi-view fusion supervision.

Specifically, through the multi-view consistency self-distillation supervision, the difference between the fused hand three-dimensional reconstruction result and the hand three-dimensional reconstruction result output by the single-view network is determined, so as to supervise the output result of the single-view network. Through the multi-view fusion supervision, the difference between the fused hand three-dimensional reconstruction result and the hand three-dimensional reconstruction result obtained after interaction is determined so as to supervise the output result of the single-view network. Through the multi-view two-dimensional consistency supervision, a difference between projection points of a hand three-dimensional model corresponding to a certain angle of view and corresponding to another angle of view is determined, so as to supervise the output result of the single-view network.

In addition, the output result of the single view network module may also be supervised in a pseudo tag supervision manner and a parameter prior supervision manner.

It should be noted that, at a data input stage, hand images taken at a plurality of angles of view can be acquired, a hand region in each hand image is detected and is deducted, the deducted hand image is scaled to a target pixel size (for example, 256 pixels) as an input image, and the input image is input to an existing hand key point positioning algorithm (for example, OpenPose) to obtain a two-dimensional pseudo tag.

The network training stage may be divided into two sub-stages, that is, a first sub-stage and a second sub-stage. In the first sub-stage, the single-view-angle network module and the cross-view interaction module are trained independently for each of the angles of view, so that the hand the projection result of projecting the three-dimensional result output by a network onto a two-dimensional image is close to the two-dimensional pseudo tag. At this point, the constraints of the multi-view consistency self-distillation supervision, the multi-view two-dimensional consistency supervision, and the multi-view fusion supervision are not used. In the second sub-stage, the constraints of the multi-view consistency self-distillation supervision, the multi-view two-dimensional consistency supervision, and the multi-view fusion supervision are added, and finally, in the result of the multi-view fusion, the fused hand three-dimensional model and the hand key point are output.

In a network test phase, the trained network supports two test modes, including a single-image test and a multi-image test. For the single-image test, a single hand image is input, and it is only necessary to perform hand estimation by means of a single-view network module and the hand three-dimensional model and the key point are input. With regard to the multi-image test, a plurality of hand images are input, the images for respective angles of view passes respectively through the single-view network module, and then sequentially pass the cross-view interaction module and the multi-view consistency supervision module, so as to obtain a hand three-dimensional model and the key point with multi-view consistence.

According to the method, apparatus and electronic device for hand three-dimensional reconstruction, hand images acquired at at least two angles of view are obtained; then, an initial hand three-dimensional reconstruction result corresponding to each of the hand images is determined based on a predetermined hand three-dimensional reconstruction network; finally, the initial hand three-dimensional reconstruction results corresponding to the hand images acquired at the at least two angles of view are fused to obtain a fused hand three-dimensional reconstruction result. In this way, the initial hand three-dimensional reconstruction results corresponding to hand images acquired at various angles of view are fused, and with consistency of multiple angles of view, the fused hand three-dimensional reconstruction result is more accurate.

Figure 6:
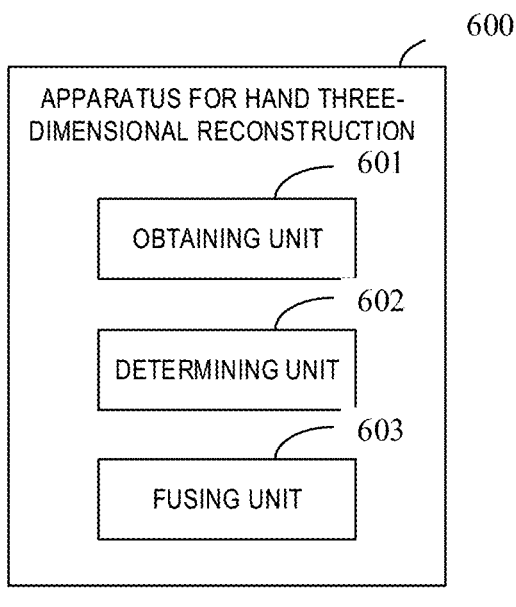
FIG. 6 is a schematic structural diagram of an embodiment of an apparatus for hand three-dimensional reconstruction according to the present disclosure.

In addition, with reference to FIG. 6, as an implementation of the method shown in the above drawings, the present application provides an embodiment of an apparatus for hand three-dimensional reconstruction. The apparatus embodiment corresponds to the method embodiment shown in FIG. 1, and the apparatus can be specifically applied to various electronic devices.

As shown in FIG. 6, the apparatus for hand three-dimensional reconstruction 600 of this embodiment includes: an obtaining unit 601, a determining unit 602, and a fusing unit 603. The obtaining unit 601 is configured to obtain hand images acquired at at least two angles of view; the determination unit 602 is configured to determine an initial hand three-dimensional reconstruction result corresponding to each of the hand images based on a predetermined hand three-dimensional reconstruction network, wherein the hand three-dimensional reconstruction result comprises a hand three-dimensional model and a hand key point; the fusing unit 603 is configured to fuse the initial hand three-dimensional reconstruction results corresponding to the hand images acquired at the at least two angles of view to obtain a fused hand three-dimensional reconstruction result.

In this embodiment, for specific processing of the obtaining unit 601, the determining unit 602, and the fusing unit 603 of the apparatus for hand three-dimensional reconstruction 600, reference may be made to Step 101, Step 102, and Step 103 in the embodiment corresponding to FIG. 1.

In some optional implementations, the determining unit 602 may be further configured to determine an initial hand three-dimensional reconstruction result corresponding to each of the hand images based on a predetermined hand three-dimensional reconstruction network in the following way: for each hand image of the hand images, determining a hand feature corresponding to the hand image based on the predetermined hand three-dimensional reconstruction network, updating the hand feature corresponding to the hand image by using an interaction feature to obtain an updated hand feature corresponding to the hand image, and determining the initial hand three-dimensional reconstruction result corresponding to the hand image based on the hand three-dimensional reconstruction network and the updated hand feature corresponding to the hand image, wherein the interaction feature is obtained by performing interaction based on hand features corresponding to respective hand images.

In some optional implementations, the determining unit 602 may be further configured to determine the hand feature corresponding to the hand image based on the predetermined hand three-dimensional reconstruction network in the following way: inputting the hand image into the predetermined hand three-dimensional reconstruction network and determining target information, wherein the target information comprises feature maps of at least one level and a hand key point; and determining the hand feature corresponding to the hand image based on the target information.

In some optional implementations, the target information includes a hand gesture vector; and the determining unit 602 may be further configured to determine the hand feature corresponding to the hand image based on the target information in the following way: determining the hand feature corresponding to the hand image based on at least one of a first hand feature, a second hand feature and a third hand feature; and the first hand feature is obtained by encoding the hand gesture vector and a coordinate of the hand key point; the second hand feature is determined by processing a feature map of a target level using a predefined graph algorithm; and the third hand feature is obtained by projecting the hand key point onto feature maps of other levels other than the feature map of the target level, and determining features at projection position points on respective feature maps.

In some optional implementations, the determining unit 602 may be further configured to determine the hand feature corresponding to the hand image based on at least one of the first hand feature, the second hand feature and the third hand feature in the following manner: concatenating the first hand feature, the second hand feature and the third hand feature to obtain the hand feature corresponding to the hand image.

In some optional implementations, the interaction feature is determined in the following way: performing interaction on the hand features corresponding to respective hand images based on a predetermined cross-view attention algorithm and/or a predetermined view-sharing algorithm, to obtain the interaction feature.

In some optional implementations, the cross-view attention algorithm determines the interaction feature in the following way: determining an attention score between hand key points corresponding to respective hand images, and performing the interaction on the hand features corresponding to the respective hand images by using the attention score to obtain the interaction feature.

In some optional implementations, the view-sharing algorithm determines the interaction feature in the following way: determining features of respective hand key points with the highest response at different angles of view using maximum value pooling; and performing the interaction on the hand features corresponding to respective hand images by using the features of the respective hand key points with the highest response at different angles of view to obtain the interaction feature.

In some optional implementations, the apparatus for hand three-dimensional reconstruction 600 further includes a loss value determining unit (not shown in the drawings) and an adjusting unit (not shown in the drawings). The loss value determining unit may be further configured to determine a loss value using a predetermined loss function based on the fused hand three-dimensional reconstruction result and the initial hand three-dimensional reconstruction results; the adjusting unit is configured to adjust a network parameter of the hand three-dimensional reconstruction network by using the loss value, to obtain an adjusted hand three-dimensional reconstruction network.

In some optional implementations, the loss value determining unit may be further configured to determine the loss value using the predetermined loss function based on the fused hand three-dimensional reconstruction result and the initial hand three-dimensional reconstruction in the following way: determining a difference between the fused hand three-dimensional reconstruction result and the initial hand three-dimensional reconstruction results as the loss value.

In some optional implementations, the loss value determining unit may be further configured to determine the loss value using the predetermined loss function based on the fused hand three-dimensional reconstruction result and the initial hand three-dimensional reconstruction in the following way: for each of the at least two angles of view, projecting an initial hand three-dimensional model corresponding to the angle of view onto the hand image of the angle of view to obtain a first projection point set, and rotating an initial hand three-dimensional model corresponding to an angle of view other than the angle of view, to the angle of view, and projecting the rotated hand three-dimensional model onto the hand image at the angle of view to obtain a second projection point set, and determining a difference between the first projection point set and the second projection point set as the loss value.

In some optional implementations, the loss value determining unit may be further configured to determine the loss value using the predetermined loss function based on the fused hand three-dimensional reconstruction result and the initial hand three-dimensional reconstruction in the following way: identifying hand key points in the hand images acquired at the at least two angles of view as a pseudo tag by using a predefined hand key point positioning algorithm; and taking a difference between the pseudo tag and an initial hand key point as the loss value.

In some optional implementations, the loss value determining unit may be further configured to determine the loss value using the predetermined loss function based on the fused hand three-dimensional reconstruction result and the initial hand three-dimensional reconstruction in the following way: obtaining a predetermined hand three-dimensional model reference template; and taking a difference between the hand three-dimensional model reference template and an initial hand three-dimensional model as the loss value.

Figure 7:
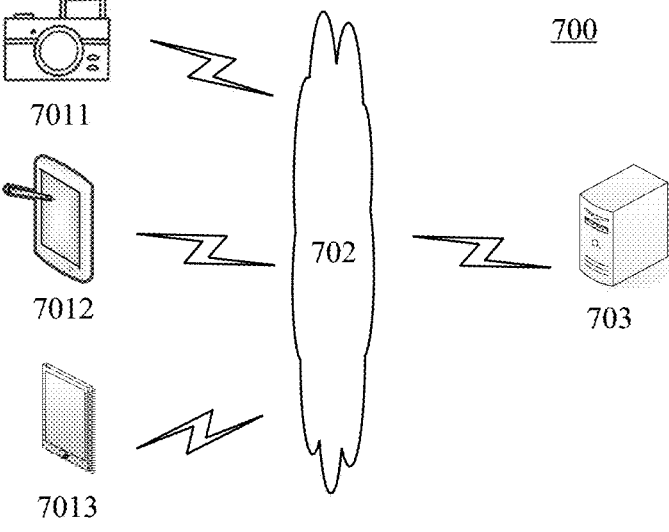
FIG. 7 is an exemplary system architecture diagram in which various embodiments of the present disclosure may be applied.

FIG. 7 illustrates an exemplary system architecture 700 of an embodiment to which the method for hand three-dimensional reconstruction of the present disclosure may be applied.

As shown in FIG. 7, the system architecture 700 may include terminal devices 7011, 7012, 7013, a network 702 and a server 703. The network 702 is configured to provide the medium of the communication links between the terminal devices 7011, 7012, 7013 and the server 703. The network 702 may include various connection types, such as wire, wireless communication links, or fiber optic cables, etc.

A user may use the terminal devices 7011, 7012, and 7013 to interact with the server 703 over the network 702 to send or receive messages and the like. For example, the server 703 may receive hand images transmitted by the terminal devices 7011, 7012, and 7013. Various communication client applications may be installed on the terminal devices 7011, 7012, and 7013, for example, an image processing application, an image capturing application, and instant messaging software.

The terminal devices 7011, 7012, and 7013 may be hardware or software. When the terminal devices 7011, 7012, and 7013 are hardware, the terminal devices may be various electronic devices that have display screens and support information interaction, including but not limited to a smart camera, a smart phone, a tablet computer, and a laptop portable computer. When the terminal devices 7011, 7012, and 7013 are software, the terminal devices 7011, 7012, and 7013 may be installed on the above electronic devices, and may be implemented as a plurality of software or software modules (for example, a plurality of software or software modules for providing a distributed service), or may be implemented as a single piece of software or software module, which will not be limited specifically herein.

The server 703 may be a server that provides various services. For example, it may be a backend server that processes hand images at various angles of view. The server 703 may first obtain hand images acquired at at least two angles of view from the terminal devices 7011, 7012, 7013; then, an initial hand three-dimensional reconstruction result corresponding to each of the hand images is determined based on a predetermined hand three-dimensional reconstruction network; then, the initial hand three-dimensional reconstruction results corresponding to the hand images acquired at the at least two angles of view are fused to obtain a fused hand three-dimensional reconstruction result.

It should be noted that, the server 703 may be hardware or software. When the server 703 is hardware, the server 703 may be implemented as a distributed server cluster constituted of a plurality of servers, or may be implemented as a single server. When the server 703 is software, the server 703 may be implemented as a plurality of software or software modules (for example, for providing a distributed service), or may be implemented as a single software or software module, which will not be limited specifically herein.

It should also be noted that the method for hand 3D reconstruction provided by the embodiments of the present disclosure is generally performed by the server 703, and the apparatus for hand 3D reconstruction is generally provided in the server 703.

It should be understood that the number of the terminal devices, networks, and servers in FIG. 7 is merely illustrative. There may be any number of terminal devices, networks, and servers as needed for implementation.

Figure 8:
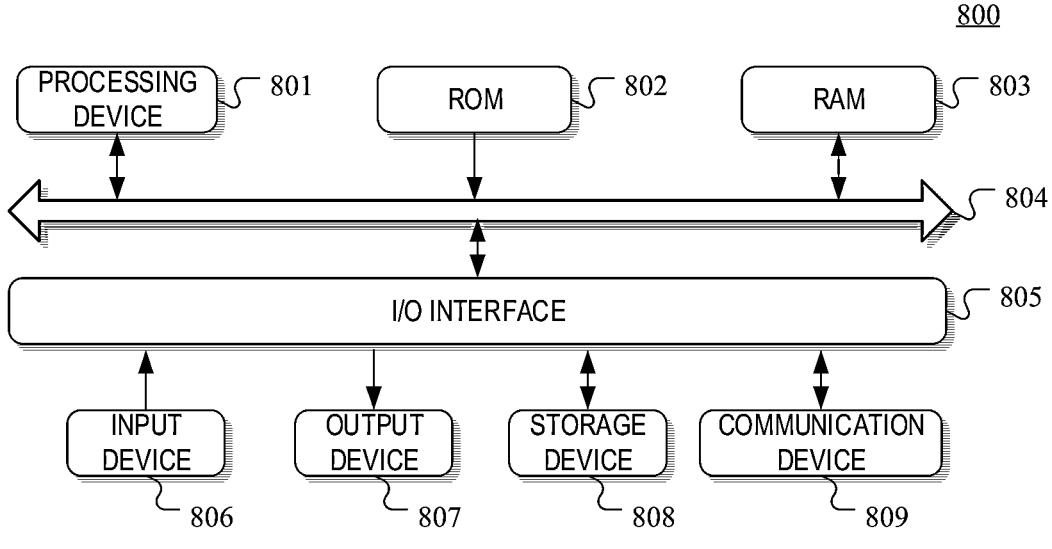
FIG. 8 is a schematic structural diagram of a computer system suitable for implementing an electronic device according to an embodiment of the present disclosure.

Referring now to FIG. 8, FIG. 8 illustrates a block diagram of an electronic device (e. g., a server in FIG. 7) 800 suitable for implementing embodiments of the present disclosure. The electronic device shown in FIG. 8 is only one example and should not limit the functions and scope of usage of embodiments of the present disclosure.

As shown in FIG. 8, the electronic device 800 may include a processing device (such as a central processing unit, graphics processing unit, etc.) 801, which may perform various appropriate actions and processes based on programs stored in Read-Only Memory (ROM) 802 or loaded from storage device 808 into Random Access Memory (RAM) 803. In the RAM 803, various programs and data necessary for the operation of the electronic device 800 are also stored. The processing device 801, ROM 802, and RAM 803 are connected to each other through a bus 804. An Input/Output I/O interface 805 is also connected to the bus 804.

Generally, the following devices can be connected to I/O interface 805: input devices 806 including, for example, touch screens, touchpads, keyboards, mice, cameras, microphones, accelerometers, gyroscopes, etc.; output devices 807 including liquid crystal displays (LCDs), speakers, vibrators, etc.; storage devices 808 including magnetic tapes, hard disks, etc.; and a communication device 809. The communication device 809 may allow the electronic device

800 to communicate with other devices wirelessly or wirelessly to exchange data. Although FIG. 8 shows an electronic device 800 with a plurality of devices, it shall be understood that it is not required to implement or have all of the devices shown. More or fewer devices can be implemented or provided instead. Each block shown in FIG. 8 may represent a single device, or may represent a plurality of devices as desired.

In particular, according to embodiments of the present disclosure, the process described above with reference to the flowchart can be implemented as a computer software program. For example, an embodiment of the present disclosure includes a computer program product that includes a computer program carried on a computer-readable medium, where the computer program includes program code for performing the method shown in the flowchart. In such an embodiment, the computer program can be downloaded and installed from a network through the communication device 809, or installed from the storage device 808, or installed from the ROM 802. When the computer program is executed by the processing device 801, the above functions defined in the method of the embodiment of the present disclosure are performed. It should be noted that the computer-readable medium of the embodiments of the present disclosure can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the embodiments of the present disclosure, a computer-readable storage medium may be any tangible medium containing or storing a program that can be used by an instruction execution system, apparatus, or device, or can be used in combination with an instruction execution system, apparatus, or device. In the embodiments of the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatuses, or devices. The program code contained on the computer-readable medium may be transmitted using any suitable medium, including but not limited to: wires, optical cables, RF (radio frequency), etc., or any suitable combination thereof.

The computer-readable medium can be included in the electronic device, or it can exist alone without being assembled into the electronic device. The above-mentioned computer-readable medium carries one or more programs, and when the above-mentioned one or more programs are executed by the electronic device, the electronic device executes steps of: obtaining hand images acquired at at least two angles of view; determining an initial hand three-dimensional reconstruction result corresponding to each of the hand images based on a predetermined hand three-dimensional reconstruction network, r wherein the hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

Computer program codes for performing the operations of the embodiments of the present disclosure may be written in one or more programming languages or a combination thereof, including to Object Oriented programming languages-such as Java, Smalltalk, C++, and also conventional procedural programming languages-such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including local area network (LAN) or wide area network (WAN)-connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

According to one or more embodiments of the present disclosure, there is provided a method for hand three-dimensional reconstruction. The method includes: obtaining hand images acquired at at least two angles of view; determining an initial hand three-dimensional reconstruction result corresponding to each of the hand images based on a predetermined hand three-dimensional reconstruction network, wherein the hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

According to one or more embodiments of the present disclosure, determining the initial hand three-dimensional reconstruction result corresponding to each of the hand images based on the predetermined hand three-dimensional reconstruction network includes: for each hand image of the hand images, determining a hand feature corresponding to the hand image based on the predetermined hand three-dimensional reconstruction network, updating the hand feature corresponding to the hand image by using an interaction feature to obtain an updated hand feature corresponding to the hand image, and determining the initial hand three-dimensional reconstruction result corresponding to the hand image based on the hand three-dimensional reconstruction network and the updated hand feature corresponding to the hand image, wherein the interaction feature is obtained by performing interaction based on hand features corresponding to respective hand images.

According to one or more embodiments of the present disclosure, determining the hand feature corresponding to the hand image based on the predetermined hand three-dimensional reconstruction network includes: inputting the hand image into the predetermined hand three-dimensional reconstruction network and determining target information, wherein the target information comprises feature maps of at least one level and a hand key point; and determining the hand feature corresponding to the hand image based on the target information.

According to one or more embodiments of the present disclosure, the target information includes a hand gesture vector; and determining the hand feature corresponding to the hand image based on the target information includes: determining the hand feature corresponding to the hand image based on at least one of a first hand feature, a second hand feature and a third hand feature; and the first hand feature is obtained by encoding the hand gesture vector and a coordinate of the hand key point; the second hand feature is determined by processing a feature map of a target level using a predefined graph algorithm; and the third hand feature is obtained by projecting the hand key point onto feature maps of other levels other than the feature map of the target level, and determining features at projection position points on respective feature maps.

According to one or more embodiments of the present disclosure, determining the hand feature corresponding to the hand image based on at least one of the first hand feature, the second hand feature and the third hand feature includes: concatenating the first hand feature, the second hand feature and the third hand feature to obtain the hand feature corresponding to the hand image.

According to one or more embodiments of the present disclosure, the interaction feature is determined in the following way: performing interaction on the hand features corresponding to respective hand images based on a predetermined cross-view attention algorithm and/or a predetermined view-sharing algorithm, to obtain the interaction feature.

According to one or more embodiments of the present disclosure, the cross-view attention algorithm determines the interaction feature in the following way: determining an attention score between hand key points corresponding to respective hand images, and performing the interaction on the hand features corresponding to the respective hand images by using the attention score to obtain the interaction feature.

According to one or more embodiments of the present disclosure, the view-sharing algorithm determines the interaction feature in the following way: determining features of respective hand key points with the highest response at different angles of view using maximum value pooling; and performing the interaction on the hand features corresponding to respective hand images by using the features of the respective hand key points with the highest response at different angles of view to obtain the interaction feature.

According to one or more embodiments of the present disclosure, the method further includes: determining a loss value using a predetermined loss function based on the fused hand three-dimensional reconstruction result and the initial hand three-dimensional reconstruction results; and adjusting a network parameter of the hand three-dimensional reconstruction network by using the loss value, to obtain an adjusted hand three-dimensional reconstruction network.

According to one or more embodiments of the present disclosure, determining the loss value using the predetermined loss function based on the fused hand three-dimensional reconstruction result and the initial hand three-dimensional reconstruction results includes: determining a difference between the fused hand three-dimensional reconstruction result and the initial hand three-dimensional reconstruction results as the loss value.

According to one or more embodiments of the present disclosure, determining the loss value using the predetermined loss function based on the fused hand three-dimensional reconstruction result and the initial hand three-dimensional reconstruction results includes: for each of the at least two angles of view, projecting an initial hand three-dimensional model corresponding to the angle of view onto the hand image of the angle of view to obtain a first projection point set, and rotating an initial hand three-dimensional model corresponding to an angle of view other than the angle of view, to the angle of view, and projecting the rotated hand three-dimensional model onto the hand image at the angle of view to obtain a second projection point set, and determining a difference between the first projection point set and the second projection point set as the loss value.

According to one or more embodiments of the present disclosure, determining the loss value using the predetermined loss function based on the fused hand three-dimensional reconstruction result and the initial hand three-dimensional reconstruction results includes: identifying hand key points in the hand images acquired at the at least two angles of view as a pseudo tag by using a predefined hand key point positioning algorithm; and taking a difference between the pseudo tag and an initial hand key point as the loss value.

According to one or more embodiments of the present disclosure, determining the loss value using the predetermined loss function based on the fused hand three-dimensional reconstruction result and the initial hand three-dimensional reconstruction results includes: obtaining a predetermined hand three-dimensional model reference template; and taking a difference between the hand three-dimensional model reference template and an initial hand three-dimensional model as the loss value.

According to one or more embodiments of the present disclosure, an apparatus for hand three-dimensional reconstruction is provided. The apparatus comprises: an obtaining unit configured to obtain hand images acquired at at least two angles of view; a determining unit configured to determine an initial hand three-dimensional reconstruction result corresponding to each of the hand images based on a predetermined hand three-dimensional reconstruction network, wherein the hand three-dimensional reconstruction result comprises a hand three-dimensional model and a hand key point; and a fusing unit configured to fuse the initial hand three-dimensional reconstruction results corresponding to the hand images acquired at the at least two angles of view to obtain a fused hand three-dimensional reconstruction result.

According to one or more embodiments of the present disclosure, the determining unit is further configured to reconstruct the network based on a predetermined hand in three dimensions by, determining an initial hand three-dimensional reconstruction result corresponding to each hand image: for each hand image in each hand image, based on a pre-set three-dimensional reconstruction network of a hand, determining a hand feature corresponding to the hand image, and using an interaction feature to update the hand feature corresponding to the hand image, obtaining an updated hand feature corresponding to the hand image, and based on a hand three-dimensional reconstruction network and the updated hand feature corresponding to the hand image, determining an initial hand three-dimensional reconstruction result corresponding to the hand image, wherein an interaction feature is obtained by performing interaction based on a hand feature corresponding to each hand image.

According to one or more embodiments of the present disclosure, the determining unit is further configured to determine the initial hand three-dimensional reconstruction result corresponding to each of the hand images based on the predetermined hand three-dimensional reconstruction network in the following way: inputting the hand image into the predetermined hand three-dimensional reconstruction network and determining target information, wherein the target information comprises feature maps of at least one level and a hand key point; and determining the hand feature corresponding to the hand image based on the target information.

According to one or more embodiments of the present disclosure, the target information includes a hand gesture vector; and the determination unit is further configured to determine the hand feature corresponding to the hand image based on the target information by: determining the hand feature corresponding to the hand image based on at least one of a first hand feature, a second hand feature and a third hand feature; and the first hand feature is obtained by encoding the hand gesture vector and a coordinate of the hand key point; the second hand feature is determined by processing a feature map of a target level using a predefined graph algorithm; and the third hand feature is obtained by projecting the hand key point onto feature maps of other levels other than the feature map of the target level, and determining features at projection position points on respective feature maps.

According to one or more embodiments of the present disclosure, the determining unit is further configured to determine the hand feature corresponding to the hand image based on at least one of the first hand feature, the second hand feature and the third hand feature in the following way: concatenating the first hand feature, the second hand feature and the third hand feature to obtain the hand feature corresponding to the hand image.

According to one or more embodiments of the present disclosure, the interaction feature is determined in the following way: performing interaction on the hand features corresponding to respective hand images based on a predetermined cross-view attention algorithm and/or a predetermined view-sharing algorithm, to obtain the interaction feature.

According to one or more embodiments of the present disclosure, the cross-view attention algorithm determines the interaction feature in the following way: determining an attention score between hand key points corresponding to respective hand images, and performing the interaction on the hand features corresponding to the respective hand images by using the attention score to obtain the interaction feature.

According to one or more embodiments of the present disclosure, the view-sharing algorithm determines the interaction feature in the following way: determining features of respective hand key points with the highest response at different angles of view using maximum value pooling; and 23                                                                                                          24 performing the interaction on the hand features corresponding to respective hand images by using the features of the respective hand key points with the highest response at different angles of view to obtain the interaction feature.

According to one or more embodiments of the present disclosure, the apparatus for hand three-dimensional reconstruction includes a loss value determining unit and an adjusting unit, the loss value determining unit is configured to determine a loss value using a predetermined loss function based on the fused hand three-dimensional reconstruction result and the initial hand three-dimensional reconstruction results; the adjustment unit is configured to adjust a network parameter of the hand three-dimensional reconstruction network by using the loss value, to obtain an adjusted hand three-dimensional reconstruction network.

According to one or more embodiments of the present disclosure, the loss value determining unit is further configured to determine the loss value using the predetermined loss function based on the fused hand three-dimensional reconstruction result and the initial hand three-dimensional reconstruction results in the following way: determining a difference between the fused hand three-dimensional reconstruction result and the initial hand three-dimensional reconstruction results as the loss value.

According to one or more embodiments of the present disclosure, the loss value determining unit is further configured to determine the loss value using the predetermined loss function based on the fused hand three-dimensional reconstruction result and the initial hand three-dimensional reconstruction results in the following way: for each of the at least two angles of view, projecting an initial hand three-dimensional model corresponding to the angle of view onto the hand image of the angle of view to obtain a first projection point set, and rotating an initial hand three-dimensional model corresponding to an angle of view other than the angle of view, to the angle of view, and projecting the rotated hand three-dimensional model onto the hand image at the angle of view to obtain a second projection point set, and determining a difference between the first projection point set and the second projection point set as the loss value.

According to one or more embodiments of the present disclosure, the loss value determining unit is further configured to determine the loss value using the predetermined loss function based on the fused hand three-dimensional reconstruction result and the initial hand three-dimensional reconstruction results in the following way: identifying hand key points in the hand images acquired at the at least two angles of view as a pseudo tag by using a predefined hand key point positioning algorithm; and taking a difference between the pseudo tag and an initial hand key point as the loss value.

According to one or more embodiments of the present disclosure, the loss value determining unit is further configured to determine the loss value using the predetermined loss function based on the fused hand three-dimensional reconstruction result and the initial hand three-dimensional reconstruction results in the following way: obtaining a predetermined hand three-dimensional model reference template; and taking a difference between the hand three-dimensional model reference template and an initial hand three-dimensional model as the loss value.

The units involved in the embodiments of the present disclosure may be implemented through software, and they may also be implemented through hardware. The units described may also be provided in a processor. For example, a processor may be described as including an obtaining unit, a determining unit, and a fusing unit. The names of these units in some cases do not limit the unit itself, for example, the obtaining unit may also be described as "a unit for obtaining hand images acquired at at least two angles of view".

The foregoing description is merely description of the preferred embodiments of the present disclosure and the technical principles applied thereto. As will be appreciated by those skilled in the art, the scope of the present disclosure involved in the embodiments of the present disclosure is not limited to the technical solution formed by a specific combination of the described technical features, but also covers other technical solutions formed by any combination of the described technical features or equivalent features thereof without departing from the described inventive concept, such as, the technical solution formed by interchanging foregoing features with technical features having similar functions disclosed in the embodiments of the present disclosure (but not limited to those disclosed in the embodiments of the present disclosure).

What is claimed is:

1. A method of hand three-dimensional reconstruction, implemented using a dedicated hardware-based system with a processor, comprising:

obtaining hand images acquired at at least two angles of view;

determining, by using an interaction feature, an initial hand three-dimensional reconstruction result corresponding to each of the hand images based on a predetermined hand three-dimensional reconstruction network, wherein the interaction feature is obtained by performing interaction on hand features corresponding to each of the hand images, and the initial hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

2. The method of claim 1, wherein determining, by using the interaction feature, the initial hand three-dimensional reconstruction result corresponding to each of the hand images based on the predetermined hand three-dimensional reconstruction network comprises:

for each hand image of the hand images, determining a hand feature corresponding to the hand image based on the predetermined hand three-dimensional reconstruction network;

updating the hand feature corresponding to the hand image by using the interaction feature to obtain an updated hand feature corresponding to the hand image; and determining the initial hand three-dimensional reconstruction result corresponding to the hand image based on the hand three-dimensional reconstruction network and the updated hand feature corresponding to the hand image.

3. The method of claim 2, wherein determining the hand feature corresponding to the hand image based on the predetermined hand three-dimensional reconstruction network comprises:

determining target information by inputting the hand image into the predetermined hand three-dimensional reconstruction network, wherein the target information comprises a feature map of at least one level and the hand key point; and determining the hand feature corresponding to the hand image based on the target information.

4. The method of claim 3, wherein the target information comprises a hand gesture vector; and determining the hand feature corresponding to the hand image based on the target information comprising:

determining the hand feature corresponding to the hand image based on at least one of a first hand feature, a second hand feature and a third hand feature; and wherein the first hand feature is obtained by encoding the hand gesture vector and a coordinate of the hand key point;

the second hand feature is determined by processing a feature map of a target level using a predefined graph algorithm; and the third hand feature is obtained by projecting the hand key point onto feature maps of levels other than the feature map of the target level, and determining features at projection position points on respective feature maps.

5. The method of claim 4, wherein determining the hand feature corresponding to the hand image based on at least one of the first hand feature, the second hand feature and the third hand feature comprises:

concatenating the first hand feature, the second hand feature and the third hand feature to obtain the hand feature corresponding to the hand image.

6. The method of claim 1, wherein the interaction feature is determined by:

performing interaction on the respective hand features corresponding to the hand images based on a predetermined cross-view attention algorithm and/or a predetermined view-sharing algorithm, to obtain the interaction feature.

7. The method of claim 6, wherein the interaction feature is determined based on the cross-view attention algorithm by:

determining an attention score between hand key points corresponding to the hand images; and performing the interaction on the respective hand features corresponding to the hand images by using the attention score to obtain the interaction feature.

8. The method of claim 6, wherein the interaction feature is determined based on the view-sharing algorithm by:

determining features of respective hand key points with the highest response at different angles of view using maximum value pooling; and performing the interaction on the respective hand features corresponding to the hand images by using the features of the respective hand key points with the highest response at different angles of view to obtain the interaction feature.

9. The method of claim 1, further comprising:

determining a loss value using a predetermined loss function based on the fused hand three-dimensional reconstruction result and the initial hand three-dimensional reconstruction results; and adjusting a network parameter of the hand three-dimensional reconstruction network by using the loss value, to obtain an adjusted hand three-dimensional reconstruction network.

10. The method of claim 9, wherein determining the loss value using the predetermined loss function based on the fused hand three-dimensional reconstruction result and the initial hand three-dimensional reconstruction results comprises:

determining, as the loss value, a difference between the fused hand three-dimensional reconstruction result and the initial hand three-dimensional reconstruction results.

11. The method of claim 9, wherein determining the loss value using the predetermined loss function based on the fused hand three-dimensional reconstruction result and the initial hand three-dimensional reconstruction results comprises:

for each angle of view of the at least two angles of view, projecting an initial hand three-dimensional model corresponding to the angle of view onto the hand image of the angle of view to obtain a first projection point set;

rotating, to the angle of view, an initial hand three-dimensional model corresponding to an angle of view other than the angle of view;

projecting the rotated hand three-dimensional model onto the hand image at the angle of view to obtain a second projection point set; and determining a difference between the first projection point set and the second projection point set as the loss value.

12. The method of claim 9, wherein determining the loss value using the predetermined loss function based on the fused hand three-dimensional reconstruction result and the initial hand three-dimensional reconstruction results comprises:

identifying, as a pseudo tag, hand key points in the hand images acquired at the at least two angles of view by using a predefined hand key point positioning algorithm; and determining a difference between the pseudo tag and an initial hand key point as the loss value.

13. The method of claim 9, wherein determining the loss value using the predetermined loss function based on the fused hand three-dimensional reconstruction result and the initial hand three-dimensional reconstruction results comprises:

obtaining a predetermined hand three-dimensional model reference template; and determining, as the loss value, a difference between the hand three-dimensional model reference template and an initial hand three-dimensional model.

14. An electronic device, comprising: one or more processors; a tangible storage device having one or more programs stored thereon, when the one or more programs are executed by the one or more processors, the one or more processors are caused to implement a method of hand three-dimensional reconstruction, comprising:

obtaining hand images acquired at at least two angles of view;

determining, by using an interaction feature, an initial hand three-dimensional reconstruction result corresponding to each of the hand images based on a predetermined hand three-dimensional reconstruction network, wherein the interaction feature is obtained by performing interaction on hand features corresponding to each of the hand images, and the initial hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

15. The device of claim 14, wherein determining, by using the interaction feature, the initial hand three-dimensional reconstruction result corresponding to each of the hand images based on the predetermined hand three-dimensional reconstruction network comprises:

for each hand image of the hand images, determining a hand feature corresponding to the hand image based on the predetermined hand three-dimensional reconstruction network;

updating the hand feature corresponding to the hand image by using the interaction feature to obtain an updated hand feature corresponding to the hand image; and determining the initial hand three-dimensional reconstruction result corresponding to the hand image based on the hand three-dimensional reconstruction network and the updated hand feature corresponding to the hand image.

16. The device of claim 15, wherein determining the hand feature corresponding to the hand image based on the predetermined hand three-dimensional reconstruction network comprises:

determining target information by inputting the hand image into the predetermined hand three-dimensional reconstruction network, wherein the target information comprises a feature map of at least one level and the hand key point; and determining the hand feature corresponding to the hand image based on the target information.

17. The device of claim 16, wherein the target information comprises a hand gesture vector; and determining the hand feature corresponding to the hand image based on the target information comprising:

determining the hand feature corresponding to the hand image based on at least one of a first hand feature, a second hand feature and a third hand feature; and wherein the first hand feature is obtained by encoding the hand gesture vector and a coordinate of the hand key point;

the second hand feature is determined by processing a feature map of a target level using a predefined graph algorithm; and the third hand feature is obtained by projecting the hand key point onto feature maps of levels other than the feature map of the target level, and determining features at projection position points on respective feature maps.

18. The device of claim 17, wherein determining the hand feature corresponding to the hand image based on at least one of the first hand feature, the second hand feature and the third hand feature comprises:

concatenating the first hand feature, the second hand feature and the third hand feature to obtain the hand feature corresponding to the hand image.

19. The device of claim 15, wherein the interaction feature is determined by:

performing interaction on the respective hand features corresponding to the hand images based on a predetermined cross-view attention algorithm and/or a predetermined view-sharing algorithm, to obtain the interaction feature.

20. A tangible computer-readable medium having a computer program stored thereon, wherein when the program is executed by a processor of a dedicated hardware-based system, a method of hand three-dimensional reconstruction, comprising:

obtaining hand images acquired at at least two angles of view;

determining, by using an interaction feature, an initial hand three-dimensional reconstruction result corresponding to each of the hand images based on a predetermined hand three-dimensional reconstruction network, wherein the interaction feature is obtained by performing interaction on hand features corresponding to each of the hand images, and the initial hand three-dimensional reconstruction result comprises a hand three-dimensional model and a hand key point; and fusing the initial hand three-dimensional reconstruction results corresponding to the hand images acquired at the at least two angles of view to obtain a fused hand three-dimensional reconstruction result.

* * * * *